June 1, 1965 M. D. STEPATH 3,187,154
ELECTRIC ARC-GAS JET CUTTING AND GOUGING TORCH
Filed July 5, 1962 2 Sheets-Sheet 1
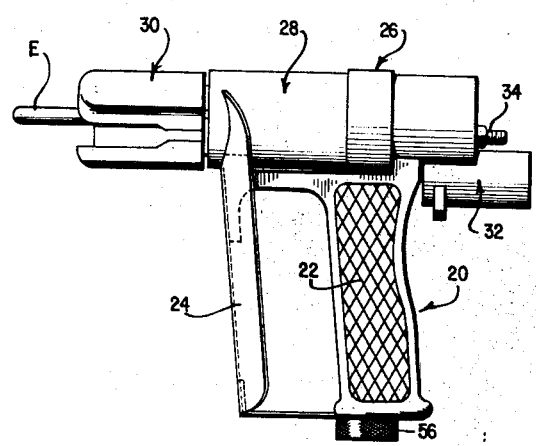
FIG. 1 FIG. 2 FIG. 3
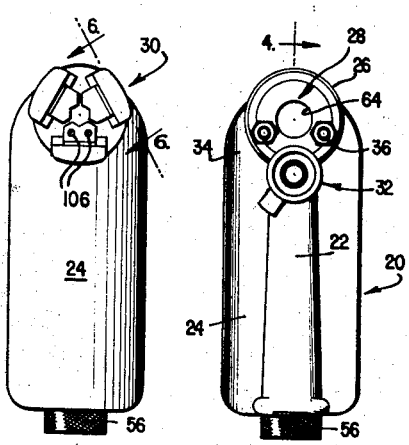
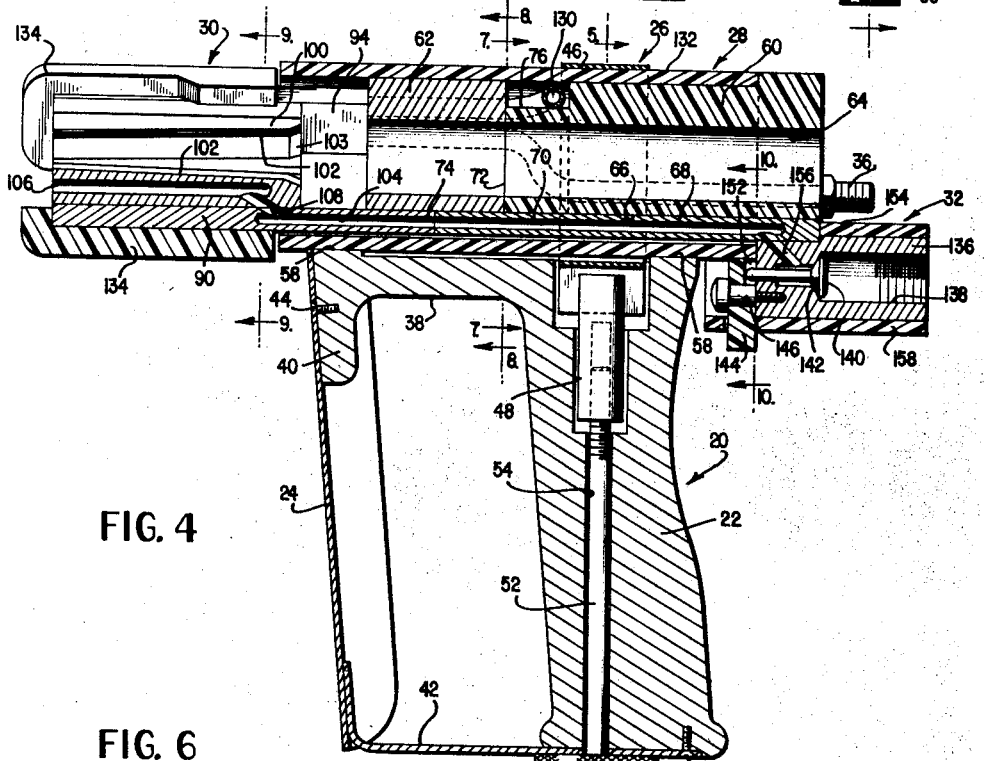
FIG. 4
FIG. 6
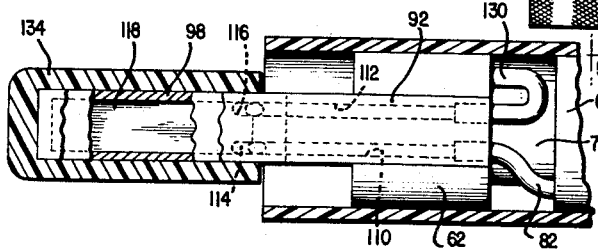
INVENTOR.
MYRON D. STEPATH
BY
Mead, Browne, Schuyler & Beveridge
ATTORNEYS.

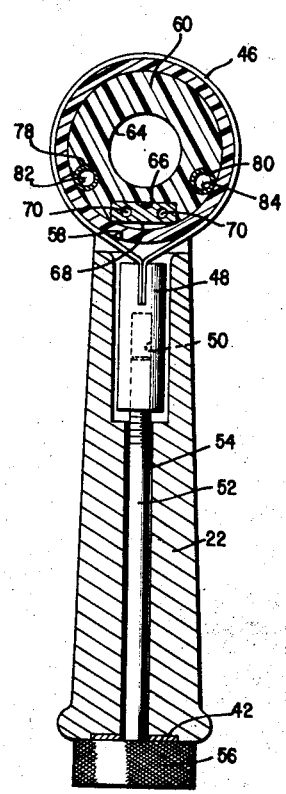
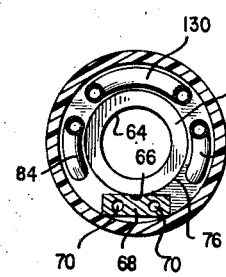
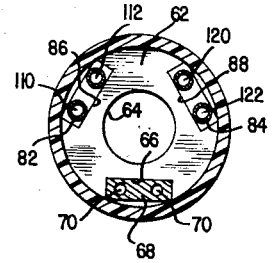
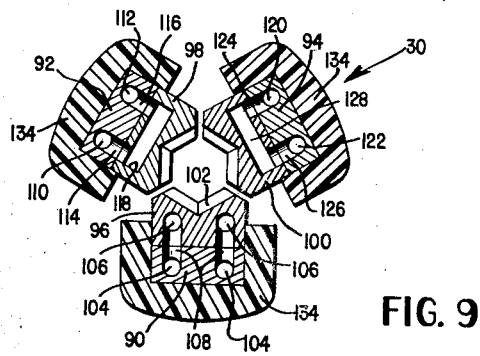
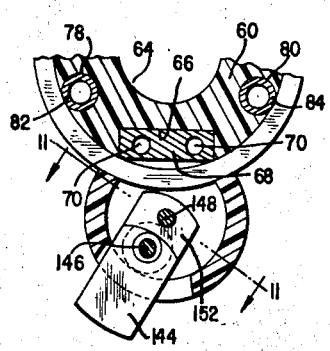
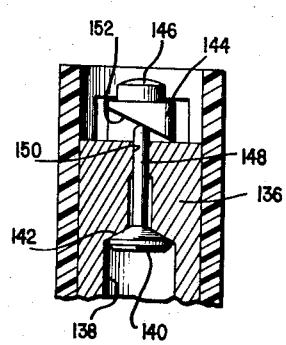
INVENTOR.
MYRON D. STEPATH

United States Patent Office 3,187,154
Patented June 1, 1965

3,187,154
ELECTRIC ARC-GAS JET CUTTING AND GOUGING TORCH
Myron D. Stepath, Lancaster, Ohio, assignor to Arcair Company, Bremerton, Wash., a partnership
Filed July 5, 1962, Ser. No. 207,715
8 Claims. (Cl. 219—70)

This invention relates to electric arc-gas jet cutting and gouging torches, and more particularly to an improved torch of the foregoing type especially adapted for use in heavy duty applications.

The type of torch with which the present invention is especially concerned is employed to remove large quantities of metal rapidly. The torch operates in a well known manner by creating an electric arc between the tip of the torch electrode and the work at the point at which metal is to be removed. High velocity gas or air jets are directed along the torch electrode to blow molten metal created by the electric arc from the work material, thus creating a semi-cylindrical groove or gouge in the work material as the torch is moved across the work material surface. The amount of metal removed from the work material during a single pass of the torch is dependent primarily upon the amount of metal which can be melted by the arc at the tip of the electrode and this, in turn, for a given size of electrode operating under normal conditions is directly proportional to the electric current density at the arc.

The electrode employed in torches of this type consists of an elongate cylindrical body of carbon which is surrounded by a thin layer of copper cladding. The copper cladding performs the dual function of providing a low resistance path for conducting electric current from the torch jaws to the tip of the electrode and also serves to increase the mechanical sturdiness of the electrode to protect the carbon body portion of the electrode from erosion by the air or gas jets directed along the electrode during operation.

In order to achieve the maximum rate of metal removal from the work material, the torches are operated at extremely high currents, and during operation the electrode becomes incandescent for a substantial length from the arc toward the electrode holder. This region of incandescence tends to remove the copper cladding from the electrode and the extreme amount of heat present over the zone of incandescence has three adverse effects on the operation of the torch. First, the extreme heat present increases the electrical resistivity of both the carbon main body and copper cladding. Second, the removal of the copper cladding from the electrode within the zone of incandescence permits the carbon main body of the electrode to become eroded by the air blast, thus reducing the cross-sectional area of the electrode. Thirdly, the loss of copper cladding within the zone of incandescence reduces the electrical conductivity of the electrode due to the loss of a low resistance path through the copper. All of the three last mentioned effects operate to reduce the current density at the arc, thus decreasing the torch efficiency.

Accordingly, it is a primary object of the present invention to provide an improved electric arc-gas jet torch wherein the length of the zone of incandescence referred to above is greatly reduced to thereby improve the efficiency of operation of the torch.

Still another object of the invention is to provide an electric arc-gas jet cutting and gouging torch having improved electric conductivity characteristics between the torch body and the arc.

Still another object of the invention is to provide a torch in accordance with the foregoing objects which may be conveniently manually operated.

The foregoing, and other objects, are achieved in a torch of relatively small overall size in which a cylindrical torch body is mounted upon a piston grip handle assembly. A central opening extends through the torch body from end to end and at the forward end of the body, three leaf spring-like jaw members are mounted in symmetrically spaced relationship about the longitudinal axis of the body. The jaws are constructed for resilient flexing movement radially of the torch axis and are formed on their radially inner surfaces with longitudinally extending grooves which cooperatively define an elongate electrode gripping seat. The electrode is normally inserted into the torch from the rearward end of the body through the central opening and is projected forwardly from the jaw members. The dimensions of the jaw assembly is such that when the electrode is axially inserted between the jaw members, the electrode is resiliently clamped between the jaw members.

One of the three jaw members is formed with gas jet orifices from which gas jets are directed longitudinally along the forwardly projecting portion of an electrode gripped in the jaw assembly. The other two jaw members are provided with passageways through which a liquid coolant fluid may be continuously circulated to conduct heat from the jaw members during operation of the torch. The electrode seat assembly defined by the jaw members provides a relatively large surface area of contact engagement between the jaw members and the electrode, thus not only insuring good electric current conduction from the jaw members to the electrode, but also providing a relatively large area of contact through which heat can be conducted from the electrode to the jaw members and carried from the jaw members by the circulating liquid coolant to cool the electrode.

By mounting the cylindrical torch body upon the pistol grip assembly, the torch body may be rotated about its longitudinal axis relative to the pistol grip so that the jaw member from which the gas jets issue may be oriented relative to the directional movement of the torch.

Other objects and features of the invention will become apparent by reference to the drawings and to the following specification.

In the drawings:
  FIG. 1 is a side view of an electric arc-gas jet torch embodying the invention;
  FIG. 2 is a front view of the torch of FIG. 1;
  FIG. 3 is a rear view of the torch of FIG. 1;
  FIG. 4 is a detail cross-sectional view of the torch taken on line 4—4 of FIG. 3;
  FIG. 5 is a transverse cross-sectional view taken on line 5—5 of FIG. 4;
  FIG. 6 is a detail view, with certain parts broken away and others shown in cross-section taken approximately on line 6—6 of FIG. 2;
  FIG. 7 is a detail cross-sectional view taken on line 7—7 of FIG. 4;
  FIG. 8 is a detail cross-sectional view taken on line 8—8 of FIG. 4;
  FIG. 9 is a detail cross-sectional view taken on line 9—9 of FIGURE 4;
  FIG. 10 is a partial cross-sectional view taken on line 10—10 of FIG. 4; and
  FIG. 11 is a partial cross-sectional view taken on line 11—11 of FIG. 10.

Referring first to FIGS. 1 through 3, an electric arc-gas jet torch embodying the invention includes a pistol grip handle assembly designated generally 20 which is constructed with a piston grip member 22, a spatter shield plate 24 fixedly secured to the pistol grip, and a ring clamp assembly designated generally 26. Ring clamp assembly 26 is employed to clamp the torch body designated generally 28 upon handle assembly 20 in the position shown. A jaw assembly designated generally 30 is mounted upon the forward end of body 28 to support the electrode E in forwardly projecting coaxial relationship with the cylindrical body 28. At the rearward end of body 28, a connector assembly 32 is mounted upon the body through which electric power and gas under pressure are conducted to the operative elements of the torch. Also at the rearward end of body 28, a pair of liquid coolant fittings are mounted upon the body, fitting 34 serving as an inlet while a second fitting 36 serves as a coolant outlet.

Referring now particularly to FIGS. 4 and 5, handle assembly 20 includes the main handle portion 22 shaped in the fashion of a pistol grip, handle 22 being constructed with a forwardly projecting extension 38 at its upper and forward end which provides a mounting portion 40 for the upper end of spatter shield 24. A rearwardly projecting bracket 42 secured as by welding to the lower end of spatter shield 24 extends rearwardly beneath the lower end of handle 22. Screws such as 44 are employed to secure the rigid shield and bracket to handle 22.

Clamp assembly 26 includes a ring clamp 46 formed from a sheet metal strap whose opposite ends are fixedly secured, as best seen in FIG. 5, to the upper end of a lug 48. The lower end of lug 48 is tapped and bored as at 50 to threadably receive the threaded portion of a clamping screw 52 which is loosely received within a bore 54 extending upwardly from the lower end of handle 22. A knurled head 56 fixedly secured to the lower end of screw 52 is employed to manually rotate screw 52 to draw ring clamp 46 downwardly to clamp the cylindrical main torch body 28 against a pair of upwardly opening concave seats 58 formed on the upper surface of handle assembly 20. As best seen in FIG. 5, seats 58 are complementary in shape to the outer cylindrical surface of main torch body 28 and, when clamp 26 is loosened, the entire torch body may be rotated about its longitudinal axis to a selected position of rotative relationship to handle assembly 20 and then clamped into the adjusted rotative position by tightening clamp assembly 26. The purpose of this rotative adjustment will be discussed in greater detail below.

Main torch body 28 includes a generally cylindrical hollow open ended main body member which is made up of an insulating member 60 and a current carrying member 62. Members 60 and 62 are formed with a coaxial electrode passage 64 which extends commonly through both parts from end to end. As best seen in FIGS. 5 and 8, a longitudinally extending slot 66 is formed to extend along the bottom of both members from end to end. Slot 66 is dimensioned to snugly and permanently receive an elongate rectangular current carrying block 68 through which a pair of gas conducting passages 70 is bored. As best seen in FIG. 4, block 68 projects forwardly beyond the juncture 72 of members 60 and 62 to a forward end located at 74, the forward end of block 68 being fixedly secured to current carrying member 62 in electrically conductive relationship therewith.

At the forward end of insulating member 60, a reduced diameter section 76 is formed. A pair of bores 78 and 80 extend forwardly through member 60 from its rearward end to open into the reduced diameter section. Liquid coolant conducting tubing is snugly received within the bores 78 and 80, the tube 82 received within bore 78 being connected at its rearward end to inlet fitting 34, while tube 84 received within bore 80 being connected to outlet fitting 36.

Referring now particularly to FIG. 8, two additional slots 86 and 88 are formed in current carrying member 62 in symmetrical relationship with slot 66. Slots 86 and 88, and the forward end of slot 66 serve as seats which receive one end of elongate current carrying jaw arm members 90, 92 and 94 respectively. As best seen in FIG. 4, jaw arm members 90, 92 and 94 project forwardly from the forward end of current carrying member 62 to which their rearward ends are fixedly secured within the respective slots 66, 86 and 88 as by brazing. The longitudinal center lines of the respective jaw arm members are normally disposed in parallel relationship with the longitudinal axis of bore 64, but because of the cantilevered mounting of the jaw arm members, their outer ends are capable of resiliently resisted flexing movement radially of the axis of bore 64. Arm members 90, 92 and 94 are preferably constructed of beryllium copper which combines the desired mechanical flexing characteristics with a high electrical conductivity.

On the radially inner sides of each jaw arm member, elongate electrode seat defining members 96, 98 and 100 are respectively secured to arms 90, 92 and 94. The outward appearance of each electrode seat defining member is identical with the others, and each is formed with a seat defining groove 102 which, as best seen in FIGS. 4 and 9, is so formed that the grooves are normally inclined radially inwardly of the axis of bore 64 from their rear to front ends.

As best seen in FIG. 9, the relationship of the electrode seat defining members and seat defining grooves 102 is such that when viewed forwardly in an axial direction, grooves 102 cooperatively define a hexagonal opening. At the rearward ends of the grooves 102 (right-hand end as viewed in FIG. 4), the hexagonal opening is so dimensioned as to be tangent to a circle having a diameter equal to the diameter of the electrode E which is to be employed by the torch. Because of the radially inward and forward inclination of grooves 102 at the forward end of grooves 102, the hexagonal opening cooperatively defined by the three electrode seat members is smaller than the diameter of the electrode E. Electrodes are inserted into the torch from the rearward end of bore 64 and the forward end of the electrode is pushed axially through jaw assembly 30 until the tip of the electrode projects from the forward end of the jaw assembly as illustrated in FIG. 1. In order to pass through the jaw assembly, the electrode must force the forward ends of the seat defining members 96, 98 and 100 radially outwardly and this radial outward movement is resiliently resisted by the flexing of jaw arm members 90, 92 and 94 which act as leaf spring-like members. Thus, when an electrode is in place within jaw assembly 30, grooves 102 are wedged outwardly to extend parallel to the axis of bore 64 and jaw arm members 90, 92 and 94 resiliently bias seat defining members 96, 98 and 100 radially inwardly to firmly grip the electrode, while at the same time providing a substantial area of contact engagement between the electrode seat members and the electrode to assure maximum efficiency of transmission of electric current from the jaw assembly to the electrode.

To facilitate the insertion of electrodes into the jaw assembly and to permit the use of mechanically joined electrodes, the rearward ends of grooves 102 are chamfered as at 103 (FIG. 4).

The respective jaw arm members and electrode seat members differ from each other in certain respects. Jaw arm 90 is formed with a pair of bores 104 which are in direct communication at their rearward ends at joint 74 with the respective passages 70 formed in current carrying member 68. Electrode seat member 96 is likewise formed with a pair of bores 106 which are respectively connected to each of the bores 104 at their rearward end by a connecting passage 108 formed by cooperatively related bores in seat member 96 and arm member 90. Thus, a pair of continuous passages 70, 104, 108, 106 are formed which open at the forward end of electrode seat member 96. These passages are adapted to conduct gas under pressure, supplied to the rearward end of each passage 70 by the connector assembly 32 in a manner to be described more fully below. Gas under pressure passes through the above described passageways and issues from the open forward end of passages 106 in high velocity jets which are directed longitudinally along the sides of the forwardly projecting portion of electrode E. These jets serve to blow molten metal created by the arc of electrode E on a metallic work piece away from the arc, thus enabling the torch to cut or gouge heavy metallic members in a manner well known in this art.

The structural configuration of jaw arm member 92 and its electrode seat member 98 is identical to that of arm member 94 and its associated seat member 100. Referring to FIGS. 6 and 9, jaw arm member 92 is formed with a pair of bores 110 and 112 which communicate via cross passages 114 and 116 with an internal chamber 118 formed in the interior of electrode seat defining member 98. Similar passages 120 and 122, cross passages 124 and 126 and an internal chamber 128 are provided in the assembly of arm member 94 and seat member 100. Referring now to FIG. 6, passage 110 is connected at its rearward end to tube 82 which, as described above, is connected to liquid coolant inlet 34 at the rear of the torch. Liquid coolant passes from tube 82, through passages 110 and 114 into chamber 118 and is conducted from chamber 118 through passages 116 and 112 to a cross connecting tube 130 which hydraulically connects the rearward end of passage 112 to the rearward end of passage 120. The liquid then flows from passage 120 through cross passage 124 into chamber 128 and out of chamber 128 through passage 126, 122 to tube 84 which is connected to liquid coolant outlet 36 at the rearward end of the torch. Liquid coolant is continuously circulated through the above described series of tubes and passages to conduct heat from the jaw assemblies defined by arm 92 and its seat member 98 and arm 94 and its associated seat member 100.

To electrically insulate the exposed surfaces of current carrying member 62 and the various jaw elements, a cylindrical tube 132 of electrical insulation material is snugly fitted over current carrying member 62 and extends rearwardly to fit over a substantial portion of insulating member 60 as best seen in FIG. 4. The outer surfaces of each of the individual jaw assemblies is covered by a cap of insulation such as 134, the caps 134 being separate from tube 132 to permit the above described flexing of the various jaw arm members.

Electric power and gas under pressure are supplied to the torch through connector assembly 32. Assembly 32 consists of a metallic body member 136 which is bored and tapped as at 138 to provide a mechanical connection to the end of a conduit (not shown) which is constructed to supply gas under pressure to bore 138 and to simultaneously electrically connect connector body 136 to a source of electric power. Body 136 is brazed or welded to the rearward end of current carrying block 66 and is in direct electrical communication with the various electrode seat members 96, 98 and 100 via current carrying members 68 and 62 which are in turn directly connected to the respective jaw arm members.

The flow of gas under pressure from the internal chamber defined by bore 138 is controlled by a valve head 140 slideably mounted in body 136 and normally urged against a valve seat 142 by the pressure of gas in bore 138. Valve head 140 is moved away from its seat 142 by a cam member 144 of electrical insulating material pivotally supported upon the forward end of body 136 by a pin assembly 146. As best seen in FIG. 11, valve stem 148 projects forwardly from valve head 140 and is slideably received within a bore 150 in body 136. The projecting portion of valve stem 148 engages an inclined surface 152 formed on cam 144. Pivotal movement of cam 144 about pin 146 in a direction moving inclined surface 152 to the left as viewed in FIG. 11 causes the inclined surface 152 to force valve head 140 away from its seat 142, thus placing bore 138 in communication with passages 70 via a reduced diameter counter bore 154 and suitable cross connecting passages 156. Connector assembly 132 is electrically insulated by a tubular insulation member 158.

The torch described above has been found to fill a long existant need in the electric arc-gas jet cutting and gouging field in that it is capable of achieving and maintaining an extremely high current density at the arc to achieve maximum arc temperatures, thereby increasing the rate at which metal may be removed from the work material. The relatively high current density is achieved by the positive cooling action applied to the electrode combined with the high efficiency of current transfer between the jaw members and the electrode by virtue of the relatively large area of contact between the electrode and jaw members. The relatively large contact area also increases the rate of heat transfer from the electrode to the jaw members from which heat is constantly removed in turn by the circulating liquid coolant. The cooling of the electrode reduces the length of the zone of incandescence which extends from the arc or tip of the electrode toward the jaw assembly, thereby increasing the length over which the copper cladding of the electrode extends toward the arc. In addition to the increased electrical conductivity achieved by the cooling of the electrode, the increased length of cladding likewise serves to increase the overall electrical conductivity of the active portion of the electrode both by providing a relatively low resistance path through the copper and further by shielding the carbon center of the electrode from the eroding action of the gas jet. The torch construction is such that a relatively large electrode may be successfully employed with a torch which can be conveniently handled manually, an extremely desirable feature in heavy duty operations where frequently it is impractical to move the work material. The capability of rotatively adjusting the main body of the torch upon the pistol grip handle by clamp assembly 26 enables the gas jet to be oriented relative to the direction in which the torch is moved by the operator, thereby permitting greater freedom of movement and convenience to the torch operator.

While one exemplary embodiment of the invention has been disclosed, it will be apparent to those skilled in the art that the disclosed embodiment may be modified. Therefore, the foregoing description is to be considered exemplary rather than limiting, and the true scope of the invention is that defined in the following claims.

I claim:

1. An electric arc-gas jet torch comprising an elongate hollow tubular body open at its front and rear ends to permit feeding of an elongated electrode axially therethrough, a plurality of elongate current carrying jaw members integrally joined rearwardly of their forward ends and fixed to the front end of said tubular body and projecting forwardly from said tubular body in symmetrically spaced relationship about the longitudinal axis of said tubular body, means on the radially inner surfaces of each of said jaw members cooperatively defining an electrode seat for resiliently gripping and supporting an electrode in a position extending coaxially of said tubular body with the forward end of the electrode projecting forwardly beyond said jaw members, connector means for supplying electric power and gas under pressure to said tubular body, means for conducting electric power from said connector means to all of said jaw members, means for conducting gas under pressure from said connector means through one of said jaw members and discharging said gas in forwardly directed jets along the sides of the forwardly projecting portion of an electrode supported by said electrode seat defining means, and means for circulating a liquid coolant through the other jaw members.

2. An electric arc-gas jet torch comprising a pistol grip type handle, a hollow cylindrical torch body open at its front and rear ends to permit feeding of an elongated electrode axially therethrough, a plurality of elongate current carrying jaw members fixed to the front end of said cylindrical member and projecting forwardly from said cylindrical member in symmetrically spaced relationship about the axis of said cylindrical member, support means on the top of said handle for supporting said cylindrical member thereon for rotation about its axis relative to said handle, means on the radially inner surfaces of said jaw members cooperatively defining an electrode seat for resiliently gripping and supporting an elongate electrode in a position extending coaxially of said cylindrical member with the forward end of the electrode projecting forwardly beyond the jaw members, connector means for supplying electric power and gas under pressure to said cylindrical member, means for conducting electric power through said cylindrical member from said connector means to all of said jaw members, means for conducting gas under pressure from said connector means through one of said jaw members and discharging said gas in forwardly directed jets along the sides of the forwardly projecting portion of an electrode supported by said electrode seat defining means, means on said handle for clamping said cylindrical member to said support means at selected positions of rotative adjustment relative to said handle, and means for circulating a liquid coolant fluid through all of said jaw members other than said one of said jaw members.

3. An electric arc-gas jet torch comprising a pistol grip type handle, a hand shield secured to said handle in forwardly spaced relationship thereto, a hollow cylindrical torch body open at its front and rear ends to permit feeding of an elongated electrode axially therethrough, a plurality of elongate current carrying jaw members fixed to the front end of said cylindrical member and projecting forwardly from said cylindrical member in symmetrically spaced relationship about the axis of said cylindrical member, support means on the top of said handle and said shield for supporting said cylindrical member thereon for rotation about its axis relative to said handle and said shield with said jaw members disposed forwardly of said shield, means on each of the radially inner surfaces of said jaw members cooperatively defining an electrode seat for resiliently gripping and supporting an elongate electrode in a position extending coaxially of said cylindrical member with the forward end of the electrode projecting forwardly beyond the jaw members, connector means for supplying electric power and gas under pressure to said cylindrical member, means for conducting electric power through said cylindrical member from said connector means to all of said jaw members, means for conducting gas under pressure from said connector means through one of said jaw members and discharging said gas in forwardly directed jets along the sides of the forwardly projecting portion of an electrode supported by said electrode seat defining means, means on said handle for clamping said cylindrical member to said support means at selected positions of rotative adjustment relative to said handle, and means for circulating a liquid coolant fluid through all of said jaw members other than said one of said jaw members.

4. An electric arc-gas jet torch comprising an elongate hollow tubular body open at its front and rear ends to permit feeding of an elongated electrode axially therethrough, a plurality of elongate current carrying jaw members fixed to the front end of said tubular body and projecting forwardly from said tubular member in symmetrically spaced relationship about the longitudinal axis of said tubular body, each jaw member comprising an arm fixedly secured at one end to the forward end of said body, an electrode seat member mounted on the radially inner side of the arm member at a location spaced forwardly from the forward end of said tubular body, each of said arm members being capable of resilient flexing movement radially of the axis of said tubular member, means on the inner sides of said seat members cooperatively defining an electrode seat adapted to be resiliently biased by said arms into gripping engagement with an elongate electrode to support said electrode coaxially of said tubular member with the forward end of the electrode projecting forwardly from the jaw members, connector means for supplying electric power and gas under pressure to said tubular member, means for conducting electric power from said connector means through said body to all of said jaw members, means for conducting gas under pressure from said connector means through one of said jaw members and discharging said gas in forwardly directed jets longitutudinally along the sides of the forwardly projecting portion of an electrode supported by said electrode seat defining means, and means for cooling said jaw members.

5. An electric arc-gas jet torch as defined in claim 4 further comprising means for circulating a liquid coolant through all of said jaw members other than said one of said jaw members.

6. Apparatus as defined in claim 4 wherein said arm members normally extend forwardly of said tubular body in parallel relationship to the axis of said tubular body, the electrode seat defining means on each seat member comprising means defining a groove in the radially inner surface of each seat member, the rearward ends of said grooves being related to each other to be tangential to a circle of a diameter equal to the diameter of an electrode to be gripped by said jaw members, said grooves in said seat members being forwardly and radially inwardly convergent when said arm members are in parallel relationship to said axis of said tubular member whereby the insertion of an electrode between said jaw members spreads the forward ends of said grooves radially outwardly against the resilient flexing action of said arm members.

7. Apparatus as defined in claim 6 wherein said tubular body is formed with a cylindrical outer surface, a pistol grip handle assembly for supporting said tubular assembly about the axis of said tubular member, and means for clamping said tubular member to said handle assembly at a selected position of rotative adjustment relative thereto.

8. An electric arc-gas jet torch as defined in claim 6 further comprising means for circulating a liquid coolant through all of said jaw members other than said one of said jaw members.

References Cited by the Examiner

UNITED STATES PATENTS

| | | | |
|---|---|---|---|
| 1,577,489 | 3/26 | Peck | 219—138 |
| 1,699,005 | 1/29 | McLean | 219—140 |
| 2,295,075 | 9/42 | Burrows et al. | 219—26 X |
| 2,350,614 | 6/44 | Jackson | 219—138 |
| 2,352,939 | 7/44 | Cockrill et al. | 219—138 |
| 2,358,158 | 9/44 | Gibbert | 219—144 |
| 2,378,707 | 6/45 | Hiller | 219—140 X |
| 2,398,946 | 4/46 | Lorant et al. | 219—144 X |
| 2,400,285 | 5/46 | Buck | 219—144 |
| 2,706,236 | 4/55 | Stepath et al. | 219—70 |

RICHARD M. WOOD, *Primary Examiner.*